United States Patent [19]

Berenschot et al.

[11] 4,137,205

[45] Jan. 30, 1979

[54] AQUEOUS EMULSION THERMOSETTING COATING COMPOSITIONS

[75] Inventors: Donald J. Berenschot, Chicago; Dale F. Anders, Des Plaines; Fred D. Hawker, Villa Park, all of Ill.

[73] Assignee: DeSoto, Inc., Des Plaines, Ill.

[21] Appl. No.: 497,342

[22] Filed: Aug. 15, 1974

[51] Int. Cl.² .................. C08L 29/00; C08L 33/14; C08L 61/28
[52] U.S. Cl. .................. 260/29.4 UA; 260/851; 260/856
[58] Field of Search .......... 260/29.4 UA, 851, 856

[56] References Cited

U.S. PATENT DOCUMENTS

| | | | |
|---|---|---|---|
| 3,118,848 | 1/1964 | Lombardi et al. | 260/29.4 UA |
| 3,218,280 | 11/1965 | Koral et al. | 260/29.4 UA |
| 3,245,932 | 4/1966 | Glavis et al. | 260/29.4 UA |
| 3,267,174 | 8/1966 | Fry et al. | 260/851 |
| 3,352,806 | 11/1967 | Hicks | 260/856 |
| 3,428,479 | 2/1969 | Dobransky | 260/29.4 UA |
| 3,723,374 | 3/1973 | Parekh et al. | 260/29.4 UA |
| 3,812,070 | 5/1974 | Kelley | 260/29.4 UA |
| 3,862,075 | 1/1975 | Sekmakas | 260/851 |
| 3,959,202 | 5/1976 | Blank | 260/856 |

*Primary Examiner*—John C. Bleutge
*Attorney, Agent, or Firm*—Dressler, Goldsmith, Clement, Gordon & Shore, Ltd.

[57] ABSTRACT

Aqueous emulsion thermosetting coating compositions possessing superior flexibility and room temperature coalescence are provided by combining certain aqueous emulsion copolymers including hydroxy and carboxy functionality, aminoplast resin and water dispersible high boiling polyhydric adduct of an aliphatic polyhydric alcohol containing from 2–4 hydroxyl groups with a monoepoxide or a lactone.

18 Claims, No Drawings

AQUEOUS EMULSION THERMOSETTING COATING COMPOSITIONS

The present invention relates to thermosetting aqueous emulsion coating compositions based on aqueous emulsion copolymers in which superior flexibility and room temperature coalescence are obtained together with numerous other advantages.

Aqueous coating compositions of the type defined intended to be thermoset on baking are subject to numerous disadvantages. Most importantly, the cured films at desired film hardness tend to be unduly brittle and the gloss is lower than desired. Also, and particularly when using aqueous emulsion copolymer particles which do not adequately coalesce on air drying and which do not sufficiently reflow on baking, it is hard to obtain smooth and uniform cured films. This invention is concerned with countering the above noted as well as other difficulties associated with thermosetting aqueous emulsion coatings.

In accordance with the present invention, certain aqueous emulsion copolymers containing carboxyl and hydroxy functionalities, are combined in aqueous medium with an aminoplast resin and a water-dispersible high boiling polyhydric adduct of an aliphatic polyhydric alcohol containing from 2–4 hydroxyl groups and preferably having from 2–6 carbon atoms with a $C_2$–$C_4$ monoepoxide or a lactone containing 3–6 carbon atoms. More particularly, the aqueous emulsion copolymer consists essentially of from 0.75–25% of non-nitrogenous hydroxy functional monoethylenically unsaturated monomer, from about 0.1% to about 15% of monoethylenically unsaturated carboxylic acid, and the balance of the copolymer consists essentially of monoethylenically unsaturated monomer free of functional groups other than the single ethylenic group. It is found in these emulsion systems that the adduct, which is a polyether or polyester, improves room temperature coalescence as well as reflow on baking, desired hardness is maintained, and flexibility is enhanced. Also, the gloss is increased and the adduct becomes an integral part of the cured film, thus minimizing the need for volatile components in the aqueous coating.

In this description, all parts or proportions are by weight, unless otherwise stated.

Referring first to the components of the copolymer, from 0.75–25%, preferably from 2–15%, of the copolymer is required to be a non-nitrogenous hydroxy functional monoethylenically unsaturated monomer. The hydroxy functional monomer is included in the copolymer by having it present in the monomer mixture which is copolymerized. Below 2%, the film hardness falls off slightly, but this can be tolerated since the other properties are so advantageous. These hydroxy functional monomers must be monethylenically unsaturated, though the monomer may contain one or several hydroxy groups. The N-methylol group includes the OH moiety, but compounds containing this group do not react in the same way as the hydroxy group. To positively exclude the N-methylol group, the hydroxy monomers of this invention are specified to be non-nitrogenous. The hydroxy group may be more precisely stated to be alcoholic.

The hydroxy functional monomers which are used in this invention are preferably illustrated by hydroxy alkyl esters of monoethylenically unsaturated monocarboxylic acids, such as hydroxy ethyl acrylate, 2-hydroxy propyl acrylate, hydroxy ethyl methacrylate, 2-hydroxy propyl methacrylate, 4-hydroxy butyl methacrylate, and the like. Other hydroxy functional monomers which can be used are trimethylol propane monallyl ether, ethylene glycol monoallyl ether, butylene glycol monoallyl ether, glycerol monoacrylate, 2-hydroxymethyl-5-norbornene, and the like. It will be understood that language is used herein with its ordinary art understood significance. Thus, unless it is otherwise made clear, functionality other than that specified is not present. Thus, an hydroxy functional monoethylenically unsaturated monomer contains no functionality other than one or more hydroxy groups and the single ethylenic group.

A small proportion of ethylenically unsaturated hydroxy-functional polyester having an hydroxyl number of from 100–350 may be included with the monomers. These polyesters are illustrated by a polyester of dehydrated castor oil fatty acids, crotonic acid, glycerin, isophthalic acid, azelaic acid and 1,1'- isopropylidenebis (p-phenyleneoxy) - di - 2 propanol. Other appropriate polyesters are taught in our copending application Ser. No. 351,453, filed Apr. 16, 1973, the disclosure of which is incorporated herein by reference, but this is not essential to this invention.

The copolymer should also include at least about 0.1%, up to about 15%, but more preferably from 0.3–10%, and most preferably from 0.5–8%, based on the weight of the copolymer, of monoethylenically unsaturated carboxylic acid, such as acrylic acid, methacrylic acid, crotonic acid, fumaric acid, monobutyl maleate, and the like. The presence of a small amount of acid helps to stabilize the aqueous dispersions in the presence of ammonia or an amine. Larger amounts above about 2% provide an additional basis for the ultimate cure with aminoplast resin.

The balance of the copolymer consists essentially of monoethylenically unsaturated monomer devoid of functional groups other than the single ethylenic group which is consumed in the copolymerization reaction. A balance of monomers producing hard homopolymers and monomers producing soft homopolymers is preferably used. While this balancing of monomers of the two types noted is itself well known, preferred practice in this invention employs a larger proportion of hardening monomer than is customary, contributing, in the thermosetting systems under consideration, an increased hardness which, in the presence of the toughness contributed by the polyhydric alcohol component, provides superior mar resistance in a flexible coating.

With respect to the balance of the copolymer, it is particularly preferred to employ styrene or vinyl toluene in combination with a $C_4$–$C_{12}$ ester of acrylic acid, especially 2-ethylhexyl acrylate. Here, an excess by weight of styrene or vinyl toluene of at least 2:1, preferably at least 3:1 and up to about 8:1 is preferred to maximize hardness. It is unusual to be able to obtain the extra hardness which is conferred through the use of excess styrene or vinyl toluene while maintaining adequate flexibility, and the long chain acrylates are especially superior from this standpoint. Simple esters with saturated alkanols are contemplated as further illustrated by dodecyl acrylate. Ethylene in amounts of from 3–30% may be used in place of the acrylate ester.

Methyl methacrylate or vinyl acetate may be used in place of styrene or vinyl toluene, especially as a partial replacement.

The selection of monomers in this invention will normally provide a copolymer having a glass transition temperature above room temperature, but copolymers having a glass transition temperature as low as about 0° C. can be used where films of lesser hardness are contemplated. The invention is particularly significant in connection with copolymers having a glass transition temperature above room temperature because aqueous emulsion copolymer particles of this type provide the hardest films though they do not coalesce well on air drying preparatory to baking. The polyhydric alcohol component in this invention allows the higher glass transition temperature copolymers to coalesce on air drying at room temperature so that subsequent baking does not have to deal with a discontinuous film which is frequently provided by the cracking and fissuring which occur when the copolymer particles do not coalesce on air drying.

Up to about 5% by weight of the copolymer may be constituted by diverse materials to improve adhesion or other special property and the inclusion of such small amount of special monomers for special purpose is contemplated by the language "consisting essentially." These special monomers are illustrated by amine-functional monoethylenic compounds such as, the reaction product of equimolar proportions of amioethyl ethanolamine, urea, and maleic anhydride, reacted with propylene oxide, and others as taught in Sekmakas U.S. Pat. Nos. 3,356,653 and 3,356,654.

The aqueous emulsion copolymer is produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are usually of high molecular weight, but the emulsion copolymers of this invention are preferably produced using mercaptan in the liquid mixture of monomers to lower the molecular weight of the copolymer particles and to render the molecular weight more uniform.

The emulsion copolymers are preferably copolymerized using a procedure which will produce fine particle size emulsions. Preferred particle size is from 0.05 to 1 micron, though from 0.01 to 3 microns is broadly contemplated. These fine particle size latex emulsions are prepared by incrementally adding the unsaturated copolymerizable material to a water solution which has dispersed therein surface active agents. The addition is made under conditions conducive to addition copolymerization so that copolymerization takes place as the materials are added, thus allowing for the formation of fine particle size emulsions. To allow copolymerization to take place as the unsaturated copolymerizable materials are added to the emulsion, it is desirable that polymerization catalyst be present in the water phase of the emulsion as the unsaturated copolymerizable materials are added thereto. It is understood that this is not essential though it is preferred, and that the polymerization catalyst can be in admixture with the unsaturated copolymerizable materials as they are added to the emulsion or the catalyst can be added to the water phase as polymerization proceeds.

The polymerization catalysts which may be used in accordance with the invention to provide conventional free radical catalysis can be of the water soluble type such as potassium persulfate, ammonium persulfate and hydrogen peroxide, or of the water-insoluble type which are soluble in one or more of the monomers used herein, such as benzoyl peroxide, cumene hydroperoxide and methyl ketone peroxide as desired. Preferably, the water-soluble catalysts are used as the monomer soluble type tend to produce large particle size emulsions. A combination of the water-soluble and monomer soluble catalysts may also be used.

When the polymerization catalysts of the persulfate type are used, they decompose resulting in acidic products. It is preferred to buffer the system to maintain the pH in the range of from 2.5-5.0 during polymerization with materials such as sodium bicarbonate, etc.

Emulsification is maintained using conventional suspending agents, particularly an anionic surface active agent, preferably in combination with a non-ionic surface active agent. In the examples set forth hereinafter, the anionic agents are sodium lauryl sulfate and sodium dodecyl benzene sulfonate and the non-ionic agent is nonyl phenoxy (polyethyleneoxy) ethanol containing about 10 ethylene oxide groups per molecule. While these specific agents are preferred, other anionic agents are illustrated by sodium dioctyl sulfosuccinate and sodium octylphenoxy polyethylene oxide sulfonate containing about 20 ethylene oxide groups per molecule. Appropriate anionic commercial compositions are Triton X-200 and Duponol ME. Other non-ionic agents are illustrated by octyl phenoxy (polyethyleneoxy) ethanol. Appropriate non-ionic commercial compositions are Triton X-100, Igepal CO-630, Tergitol NPX and Tergitol NP-14. The anionic surface active agent when used alone is preferably added in amounts of from 0.1% to 3% by weight, based on the total weight of the emulsion product produced in accordance with the invention. When the anionic surface active agent is used in combination with the non-ionic surface active agent, it is preferably added in amounts of from 0.1% to 2% by weight. The non-ionic surface active agent is preferably used in amounts of from 0.5% to 4% by weight.

The class of mercaptans which are useful as chain terminators in the polymerization of ethylenic monomers is well known and any compound having the formula R—SH can be used, R denoting a saturated hydrocarbon radical, preferably one containing from 2-24 carbon atoms. Tertiary dodecyl mercaptan will be used as illustrative. The mercaptan is used in an amount of from 0.05 to about 5%, preferably from 0.5-3%, based on the weight of the copolymer.

The aqueous emulsion of this invention include the hydroxy and carboxy functional aqueous emulsion copolymer particles in the form of solid particles which are dispersed as a latex in an aqueous continuum. The copolymer is cured by reaction of its hydroxy and carboxy groups with the N-methylol group contained in an aminoplast resin which is dispersed or dissolved in the aqueous continuum for co-deposit with the copolymer. The aminoplast resin facilitates pigmentation of the system as will be explained.

The term "aminoplast resin" is a conventional one designating heat-hardening reaction products of an aldehyde, normally formaldehyde, with a polyfunctional amine, such as urea, melamine, benzoguanamine, or other triazine. A stoichiometric excess of formaldehyde is frequently used to provide the heat-hardening properties. The resins are frequently etherified, usually with methanol, to promote water solubility. Since this class is well known for use both in water and in organic solvent for the cure of hydroxy functional resins, it will not be discussed at great length and will be illustrated herein by hexamethoxy methyl melamine which is water dispersible but not water soluble in the absence of organic solvent such as ethanol.

The proportion of aminoplast resin, based on total resin solids, may vary from about 3% to about 40%, but is preferably from 5–30%. Most usually, the aminoplast is used in an amount of from 8–25%.

Referring more particularly to the adducts of aliphatic polyhydric alcohols which may be utilized in accordance with the invention, these are high boiling polyhydric water dispersible products having a molecular weight in the range of about 300 to about 6000. The polyhydric alcohols which are adducted and the final adducts have an hydroxy functionality of from 2–4, though diols are particularly preferred since these enhance flexibility to the greatest extent which is especially desired herein. The final adducts are preferably polyhydric alcohols which are polyethers formed by reacting an aliphatic polyhydric alcohol with a $C_2$–$C_4$ monoepoxide, and these are illustrated by polypropylene glycol 425 (used in Example 1), polypropylene glycol 1025, polypropylene glycol 2025, ethylene, propylene or butylene oxide adducts of hexylene glycol, 2-methyl-2-ethyl-1,3-propanediol, 2-ethyl-1,3-hexanediol, 1,5-pentanediol, glycerin, and 1,2,6-hexanetriol. Ethylene oxide and propylene oxide adducts are preferred.

Particularly preferred products are dihydric water soluble polyether adducts having a molecular weight in the range of from about 400 to about 5000. The best properties are obtained using propylene oxide adducts of aliphatic diols.

In addition to the polyether adducts described above, polyester adducts of the same molecular weight range can also be used, these being provided by the adduction of a lactone, such as epsilon-caprolactone, with the same aliphatic polyhydric alcohols noted hereinbefore.

The lactone-based polyesters are in commerce and are usually based on epsilon-caprolactone which has the formula:

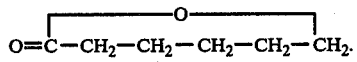

These lactones are reacted with polyhydric alcohols in known fashion to form adducts having the formula:

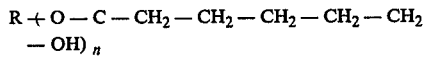

where R is the residue of the aliphatic polyhydric alcohol, preferably propylene glycol or other glycol. Thus, n is preferably 2, though it may range from 2–4.

Other lactones which may be used are illustrated by butyrolactone, gamma-valerolactone, beta-propiolactone, and the like. Thus, and while epsilon-caprolactone is preferred, $C_3$–$C_6$ lactones generally are useful.

The proportion of the polyhydric adduct can vary from about 5 to about 50 parts per 100 parts of aqueous emulsion copolymer solids, preferably from 10 to 35 parts on the same basis.

While the emulsion of this invention may be unpigmented to deposit clear films, pigmented systems are preferred. The pigment may be incorporated in any desired manner as is conventional in the production of pigmented aqueous latices. However, gloss is maximized in this invention by grinding the pigment into a water soluble or dispersible aminoplast resin which can then be mixed into the copolymer emulsion directly, or first dispersed in water to form an aqueous paste which is then mixed into the copolymer emulsion. Titanium dioxide is a typical pigment and will be used herein.

The use of ammonia or an amine to help to stabilize aqueous emulsions of acidic copolymers is itself known. Hydroxy functional amines are particularly useful and this class of materials is illustrated herein by dimethyl ethanol amine. Other amines which may be used are triethyl amine and methyl diethanol amine. Even partial neutralization is helpful, but it is preferred to use enough amine to provide a pH of 6.0 or higher up to about 11, preferably from 7 to 10. It is to be observed that ammonia or an amine can be used to disperse solution copolymers in water through salt formation which creates a significant affinity between the copolymer and the water. This is not obtained in this invention where the copolymer particles are emulsified by means of surfactant, the amine merely serving to stabilize the emulsion or latex.

The composition of the invention are cured by baking, typical baking conditions ranging from 300° F. to 550° F. for a period of time of from 30 minutes to 30 seconds.

As will be evident, the coating compositions can be pigmented or clear and dyes, waxes and various other components may be included as will be evident to those skilled in the art.

For the purpose of clarity, the term aqueous emulsion copolymer identifies a copolymer produced by emulsion polymerization in aqueous medium. This provides an aqueous coating in which the copolymer particles are of high molecular weight, insoluble in water and dispersed by the surfactants used in the emulsion polymerization. Stability is enhanced by the presence in the copolymer of a small amount of copolymerized unsaturated carboxylic acid which is at least partially neutralized by ammonia or an amine, as has been explained. The term emulsion is intended to make it clear that the copolymer is not solubilized in the water.

The invention is illustrated in the comparative examples which follow.

EXAMPLE 1

| RAW MATERIALS | PARTS |
| --- | --- |
| A. Distilled Water | 100 |
| B. Sodium Bicarbonate | 0.10 |
| C. Potassium Persulfate | 0.37 |
| D. Sodium Dodecyl Benzene Sulfonate | 0.09 |
| E. Sodium Lauryl Sulfate | 0.80 |
| F. Nonyl Phenoxy(polyethyleneoxy)ethanol (9 ½ mols of ethylene oxide per mol of phenol) | 2.42 |
| G. Styrene | 80.0 |
| H. 2-Ethylhexyl Acrylate | 12.0 |
| I. Hydroxyethyl Methacrylate | 4.0 |
| J. Methacrylic Acid | 4.0 |
| K. Tertiary Butyl Mercaptan | 1.0 |
| L. Dimethyl Ethanol Amine | 1.0 |

PROCEDURE

1. Charge 55.56 parts of item A to reactor, sparge with nitrogen for 20 minutes while heating to 75° C.

2. Blend items E and F in the remaining 44.44 parts of item A in a glass beaker. Check to determine that item F is completely solvated prior to starting step 3.

3. Charge items G through J and K to a glass beaker described in step 2 under good agitation. Items G–K may be blended prior to charging. Decrease agitation when a good pre-emulsion is obtained.

4. To the reactor, when at 75° C., charge items B, C, and D. Addition of pre-emulsion should be started within 3 to 4 minutes.

5. Start addition of pre-emulsion as described in step 3 to reactor at such a rate as to allow for a total addition time of 2½ hours. Maintain reactor temperature between 82°–84° C.

6. Hold the reactor for 2 hours after addition is complete or until solids of 50.86 is obtained. Maintain temperature between 84°–86° C.

7. Cool reactor to 37° C.

8. Charge slowly item L to reactor under good agitation.

9. Filter emulsion

EMULSION CHARACTERISTICS

Solids: 50.86%
pH: 7.8
Conversion: 99.73
Viscosity: 770 cps
Particle size: 0.129 ± 0.002 micron The polymer contained in the emulsion has a $T_g$ of about 59.7° C.

The above emulsion is formulated into the following coating compositions.

EXAMPLE 2

| Ingredient (grams) | A | B |
| --- | --- | --- |
| Titanium Dioxide | 330 | 330 |
| Dimethylethanol Amine | 4 | 4 |
| Hexamethoxy Methyl Melamine | 50 | 50 |
| Water | 75 | 75 |
| Disperse for 10 minutes, then add: | | |
| Water | 75 | 75 |
| Mix above and add slowly to: | | |
| Emulsion of Example 1 | 460 | 460 |
| Polyoxypropylene adduct of propylene glycol having a basic functionality of 2, an average molecular weight of 425 and a hydroxy number (KOH/gm.) of 265 | — | 50 |
| Dioctyl Adipate | 50 | — |
| Total | 1,044 | 1,044 |
| Percent solids | 58.8 | 63.07 |

Characteristics determined on above coating on "Metabond 36" steel panels, no primer. Applied 1.0–1.2 mil film thickness and baked at 350° F. for 20 minutes.

| | A | B |
| --- | --- | --- |
| Application by Spray | Good | Excellent |
| Pencil Hardness | 2H | 2H |
| Direct Impact | Fail 30 inch pounds | Pass 80 inch pounds |
| Reverse Impact | Fail 2 inch pounds | Pass 80 inch pounds |
| Conical Mandrel - Flexibility | 4" cracking ⅛ inch | Pass ⅛ inch |
| Gloss - 60° | 72 | 85 |
| Reflow of coating during bake | Good | Excellent |

The invention is defined in the claims which follow. We claim:

1. An aqueous emulsion thermosetting coating composition comprising water having emulsified therein:

(1) an aqueous emulsion mercaptan-terminated copolymer of ethylenically unsaturated materials produced by emulsion copolymerization in the presence of surface active agents of monomers consisting essentially, based on the weight of the copolymer, of:

A. from 0.75–25% of non-nitrogenous hydroxy functional monoethylenically unsaturated monomer;

B. from about 0.1% to about 15% of monoethylenically unsaturated carboxylic acid; and C. the balance of said copolymer consisting essentially of monoethylenically unsaturated monomer free of functional groups other than said monoethylenic unsaturation;

(2) from about 3% to about 40%, based on the total weight of resin solids, of an aminoplast resin; and (3) from about 5 to about 50 parts per 100 parts of copolymer of water dispersible high boiling polyhydric adduct of an aliphatic polyhydric alcohol having from 2–4 hydroxy groups with a $C_2$–$C_4$ monoepoxide or a lactone containing 3–6 carbon atoms, said adduct having a molecular weight of from about 300 to about 6000.

2. An aqueous emulsion as recited in claim 1 in which said copolymer includes from 0.3–10% by weight of said monoethylenically unsaturated carboxylic acid.

3. An aqueous emulsion as recited in claim 1 in which said monomers are selected to provide a copolymer having a glass transition temperature above room temperature.

4. An aqueous emulsion as recited in claim 1 in which said monoethylenically unsaturated monomers free of functional groups consist of styrene or vinyl toluene in combination with $C_4$–$C_{12}$ alcohol ester of acrylic acid, said styrene or vinyl toluene being used in a weight excess with respect to said ester of at least 2:1 up to about 8:1.

5. An aqueous emulsion as recited in claim 2 in which said hydroxy functional monomer is present in an amount of from 2–15% of said copolymer.

6. An aqueous emulsion as recited in claim 5 in which said hydroxy-functional monomer is an hydroxy alkyl ester of a monoethylenic monocarboxylic acid.

7. An aqueous emulsion as recited in claim 5 in which said monoethylenically unsaturated carboxylic acid is present in an amount of from 0.5–8% of said copolymer.

8. An aqueous emulsion as recited in claim 1 in which said copolymer is stabilized with ammonia or an amine.

9. An aqueous emulsion as recited in claim 1 in which mercaptan is present in admixture with the ethylenic materials being copolymerized in an amount of from 0.05% to about 5%, based on the weight of the copolymer.

10. An aqueous emulsion as recited in claim 1 in which said aminoplast resin is hexamethoxymethyl melamine.

11. An aqueous emulsion as recited in claim 1 in which said aminoplast resin is pigmented.

12. An aqueous emulsion as recited in claim 10 in which the dispersed hexamethoxymethyl melamine is present in an amount of from 5–30%, based on the total weight of resin solids.

13. An aqueous emulsion as recited in claim 1 in which said adduct is an adduct of ethylene oxide or propylene oxide with a saturated aliphatic polyhydric alcohol containing from 2–4 hydroxy groups as the sole reactive functionality, and from 2–6 carbon atoms.

14. An aqueous emulsion as recited in claim 13 in which said adduct has a molecular weight in the range of from about 400 to about 5000.

15. An aqueous emulsion as recited in claim 14 in which said adduct is a polyoxypropylene adduct of propylene glycol.

16. An aqueous emulsion as recited in claim 15 in which said adduct is present in an amount of from 10–35 parts per 100 parts of copolymer solids.

17. An aqueous emulsion thermosetting coating composition comprising water having dispersed therein:
(1) an aqueous emulsion mercaptan-terminated copolymer of ethylenically unsaturated materials consisting essentially, based on the weight of the copolymer, of:
   A. from 0.75–25% of non-nitrogenous hydroxy functional monoethylenically unsaturated monomer;
   B. from 0.3–10% of monoethylenically unsaturated carboxylic acid; and
   C. the balance of said copolymer consisting essentially of monoethylenically unsaturated monomers free of functional groups other than said monoethylenic unsaturation, said monomers being selected to provide a copolymer having a glass transition temperature above room temperature, and said copolymer being stabilized in the aqueous medium with ammonia or an amine;
(2) from about 3% to about 40%, based on the total weight of resin solids, of an aminoplast resin; and
(3) from about 5 to about 50 parts per 100 parts of copolymer of water soluble high boiling polyhydric polyoxyalkene adduct of an aliphatic polyhydric alcohol having from 2–4 hydroxyl groups and from 2–6 carbon atoms with a $C_2$–$C_4$ monoepoxide, said adduct having a molecular weight of from about 300 to about 6000.

18. An aqueous emulsion as recited in claim 17 in which said polyoxyalkene adduct is a polyoxypropylene adduct of propylene glycol having a molecular weight in the range of from about 400 to about 5000, and is present in an amount of from 10–35 parts per 100 parts of copolymer solids.

* * * * *